(12) United States Patent
Franzreb

(10) Patent No.: US 6,991,716 B2
(45) Date of Patent: Jan. 31, 2006

(54) DEVICE FOR MAGNETICALLY CONTROLLED ELECTRODEIONIZATION

(75) Inventor: Matthias Franzreb, Karlsruhe (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 84 days.

(21) Appl. No.: 10/772,569

(22) Filed: Feb. 5, 2004

(65) Prior Publication Data

US 2004/0154924 A1    Aug. 12, 2004

Related U.S. Application Data

(63) Continuation-in-part of application No. PCT/EP02/10215, filed on Sep. 12, 2002.

(30) Foreign Application Priority Data

Sep. 27, 2001  (DE) ................................ 101 47 842

(51) Int. Cl.
  *B01D 61/48*   (2006.01)
(52) U.S. Cl. ...................................... 204/632; 204/633
(58) Field of Classification Search ................ 204/632, 204/633, 524
  See application file for complete search history.

(56) References Cited

U.S. PATENT DOCUMENTS

| | | | |
|---|---|---|---|
| 2,970,098 A * | 1/1961 | Ellis | ........................... 204/633 |
| 4,314,905 A | 2/1982 | Etzel et al. | |
| 5,593,563 A | 1/1997 | Denoncourt et al. | |
| 5,858,191 A * | 1/1999 | DiMascio et al. | .......... 204/524 |
| 6,284,124 B1 | 9/2001 | DiMascio et al. | |

\* cited by examiner

*Primary Examiner*—Arun S. Phasge
(74) *Attorney, Agent, or Firm*—Klaus J. Bach

(57) ABSTRACT

In a device for electro-deionization (EDI) in the demineralization of aqueous solutions, which device includes ion exchange membranes arranged alternately and in spaced relationship so that between the membranes compartments are formed of which at least some are filled with cation and anion resin exchange particle fractions forming a mixed bed ion exchanger, the ion exchange resin particles of one of the two fractions include a magnetic material and a magnetic field generator is provided for generating a field for orienting the magnetic resin particles and arranging them in parallel chains extending between the membranes.

8 Claims, 5 Drawing Sheets

Prior Art

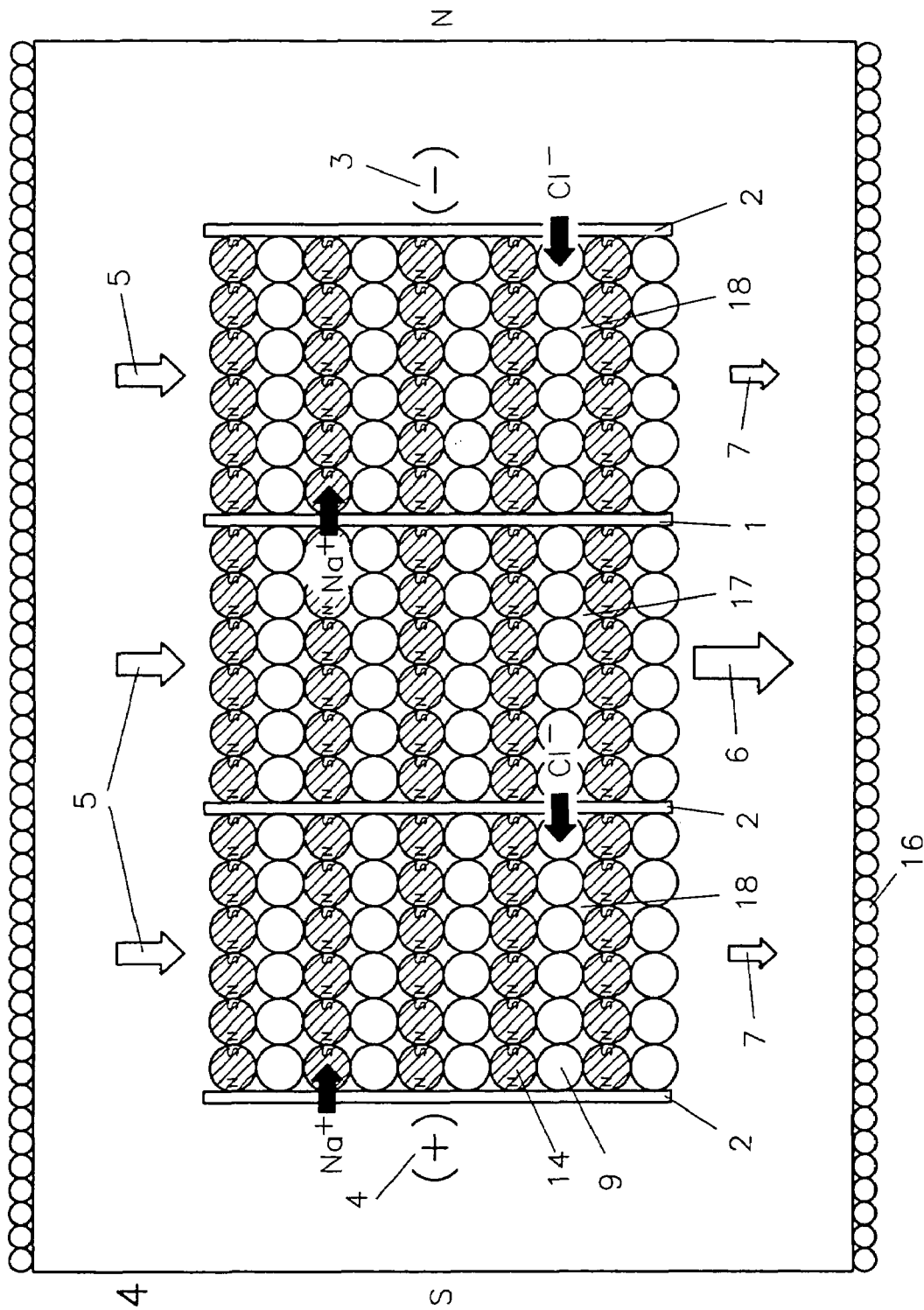

DEVICE FOR MAGNETICALLY CONTROLLED ELECTRODEIONIZATION

This is a Continuation-in-Part application of International application PCT/EP02/10215 filed Sep. 12, 2002 and claiming the priority of German application 101 47 842.9 filed Sep. 27, 2001.

BACKGROUND OF THE INVENTION

The invention relates to a device for the electrodeionization and demineralization of aqueous solutions (EDI) process.

EDI processes are already in use for the demineralization of aqueous solutions. Such a process is based in principle on a combination of electrodialysis, ion exchange and electrochemical dissociation of water for generating $H^+$ and $OH^-$ ions.

A general overview over EDI processes and apparatus is described in [1].

EDI processes include cation and anion exchange membranes which are combined to a stack of preferably equidistantly arranged elements contained in a housing. The outermost membranes are each a cation exchange membrane and an anion exchange membrane. The areas between these membranes are compartments through which a liquid is conducted by way of admission and discharge openings.

Transverse to the flow direction of the parts and orthogonally with regard to the membranes, an electric DC voltage field is applied. The field is generated by way of electrodes at the ends of the stacks, the electrodes being connected to an external voltage source.

Because of their charge, the ions in the aqueous solution travel in the electric DC voltage field toward the respective counter electrodes, that is, the cations travel to the cathode and the anions travel to the anode. The cations and anions can each pass through the cation, or respectively, anion exchange membranes. In contrast, the cation exchanger membranes are almost impenetrable barriers for the anions and the anion exchanger membranes are impenetrable barriers for the cations. With the alternating arrangement of the two membrane types, compartments are formed in the DC voltage field wherein the ions are enriched (concentric compartments (KK)) and compartments in which they are depleted (Demineralization compartments (DK)).

With an EDI device, the compartments are additionally filled with bulk particles of ion exchange resins (mixed bed), wherein the individual particles (form bodies) consist either of a cation or an anion exchanger resin and the bulk consists of particle mixtures of both types of ion exchange resins. By using a mixed bed, the electric charge transport distances in the aqueous solution, whose electric resistance is substantially increased with increasing demineralization, are shortened from the distance to the closest exchange membrane with the corresponding ion charge to the distance to a particle surface of the respective anion- or cation exchanger resin fraction. Under the influence of the electrical DC voltage field, the anions and cations received by ion exchange are passed on in the respective exchange resin within the particles and are conducted to other adjacent particles. They diffuse through—depending on the ion type—the respective permeable exchanger membrane and travel in this way from the DK to a KK. It is noted in this connection that cations can move only from cation exchanger particle to cation exchanger particle and anions can move only from anion exchanger particles to anion exchanger particles. In order for ions to cross the whole DK continuous particle chains of ion exchanger particles of the same type must be present.

Basically, in [1] two variants of an EDI device are described, one variant wherein all compartments are filled with the mixed bed (see FIG. 1a), and another variant wherein only the DK is filled with a mixed bed whereas the remaining DK are not filled with mixed bed, that is, they remain empty (see FIG. 1b).

With the use of a mixed bed consequently, the ions to be removed from the aqueous solution are exchanged already by the corresponding ion exchange resin fraction of the mixed bed with $H^+$ or $OH^-$ ions and therefore removed form the solution. The freed $H^+$ and $OH^-$ react in the aqueous solution to form water. The product obtained in the process has a very low ion concentration and therefore low conductivity.

For performing a continuous EDI, the $H^+$ and $OH^-$ ions consumed during the exchange must be continuously replenished. The needed $H^+$ and $OH^-$ ions are generated by the dissociation of water under the influence of the electric field. In this way, the ion exchanger resins are continuously regenerated without the need for chemicals herefor. In principle, the EDI is therefore a highly effective and environmentally friendly demineralization process.

Utilization of EDI devices however is quite limited because of their expensive construction and the resulting high price which is caused by the high price of the membrane material and the high expenditures for the supply and discharge of the aqueous solution. Because of the statistic distribution of the cation and anion exchanger resin particles, the acceptable membrane distance is quite limited for insuring a sufficient number of ion paths by way of contacts between the same type of particles. As a result, the present EDI devices require a relatively large number of membranes.

Various attempts have been made to alleviate this problem, that is, to increase the efficiency and to reduce costs.

The publication [2] discloses the used of so-called monosphere ion exchanger resin particles (ion exchanger resin balls), that is, of ion exchangers of a uniform particle size instead of the usual ion exchanger particles with a wide particle size distribution. The use of monosphere ion exchanger resin particles results in a higher packing density of the mixed beds and improves thereby the ion transfer. However, the problem of a statistic distribution of the different ion exchanger types remains so that the optimum distance between the membranes cannot be essentially increased.

Further, in [3] an EDI device with a layered arrangement of the two ion exchanger particle fractions is described so that, in each layer, ideally either only cations or only anion exchangers are present. This results in a drastic increase of the contact area between ion exchange particles of the same type and consequently in a substantial improvement of the ion transfer within each position. This permits a substantial increase in the spacing of the membranes. But then the efficiency of the ion storage decreases with increasing layer thickness. One of the reasons herefor is that the $H^+$ and $OH^-$ ions released during the exchange of, for example, $Na^+$ and $Cl^-$ are not formed in the immediate neighborhood and therefore cannot combine to water without delay. In this way, these ions are not withdrawn from the ion exchange equilibrium as it is normally the case. A layer-like arrangement therefore inhibits an instant neutralization which is disadvantageous for the ion reception capability.

It is the object of the present invention to provide an EDI device wherein the efficiency of the ion reception for the demineralization of aqueous solutions is also present in stacks of EDI devices with larger membrane distances.

SUMMARY OF THE INVENTION

In a device for electro-deionization (EDI) in the demineralization of aqueous solutions, which device includes ion exchange membranes arranged alternately and in spaced relationship so that between the membranes compartments are formed of which at least some are filled with cation and anion resin exchange particle fractions forming a mixed bed ion exchanger, the ion exchange resin particles of one of the two fractions include a magnetic material and a magnetic field generator is provided for generating a field for orienting the magnetic resin particles and arranging them in parallel chains extending between the membranes.

Either all the cation- or all the anion exchanger resin particles include additives which give them magnetic properties. Then, the stack with the membranes is exposed to a magnetic field with field lines which extend orthogonally to the membranes while the particles are filled into the compartments. If the particles are not permanently magnetic that is have soft magnetic properties they are magnetized.

The application of the magnetic field provides for an adjacent arrangement of the ion exchange resin particles of the magnetic fraction so as to form thin chains in the direction of the magnetic field lines whereas the non-magnetic second fraction assumes positions around these chains. Furthermore, as a result of the magnetic properties, the contacts between adjacent particles which is needed for the transport of the charges from particle to particle in a chain is ensured over the full length of the chain. Generally, the chains bridge the compartment spaces between two adjacent membranes. In addition, the individual chains of the magnetic fraction repulse one another. As a result, the chains are uniformly distributed over the compartment and extend parallel with the largest possible distance between the chains. If the mutual distance, which the chains can assume is limited by the container walls, in an ideal case, a geometric three-dimensional arrangement is formed which is composed of parallel chains of the magnetic ion exchanger fraction.

Since these chain structures are of substantially finer pitch than the layered structures of the two ion exchanger types described in [3], also the earlier described losses in the efficiency of ion transfer which increases with the thickness of the layered structures are greatly reduced.

In the selection of the magnetic properties of the ion exchanger resin fractions permanent magnetic particles or magnetically soft particles, that is particles which are not magnetic without an outer magnetic field, can be chosen.

Permanently magnetic (magnetically hard) particles have the advantage that they attract one another also without an outer magnetic field and therefore always form stable chains even if there is no outer magnetic field. On the other hand, those chains formed without outer magnetic field have the tendency to form rings or loose clumps instead of chains oriented in accordance with the given field lines of an outer field. If magnetically hard materials are used the compartments that is the space between the membranes should be densely packed and then firmly closed with a cover. The formation of rings is then prevented as the particles are held in position by the dense packing. It is also possible to maintain after the packing a weak magnetic field in the direction of the chains. This ensures that the chains remain in their stretched position.

Below the state of the art in accordance with [1] and embodiments of the magnetic field-supported EDI-device according to the invention, which will be called MEDI-device, will be described on the basis of the accompanying drawings.

BRIEF DESCRIPTION OF THE DRAWINGS

FIG. 4 shows schematically a MEDI device with a magnetic and a non-magnetic ion exchanger resin particle fraction in the compartments wherein the magnetic field is generated by an electromagnetic coil.

DESCRIPTION OF PREFERRED EMBODIMENTS

Figure 1A:
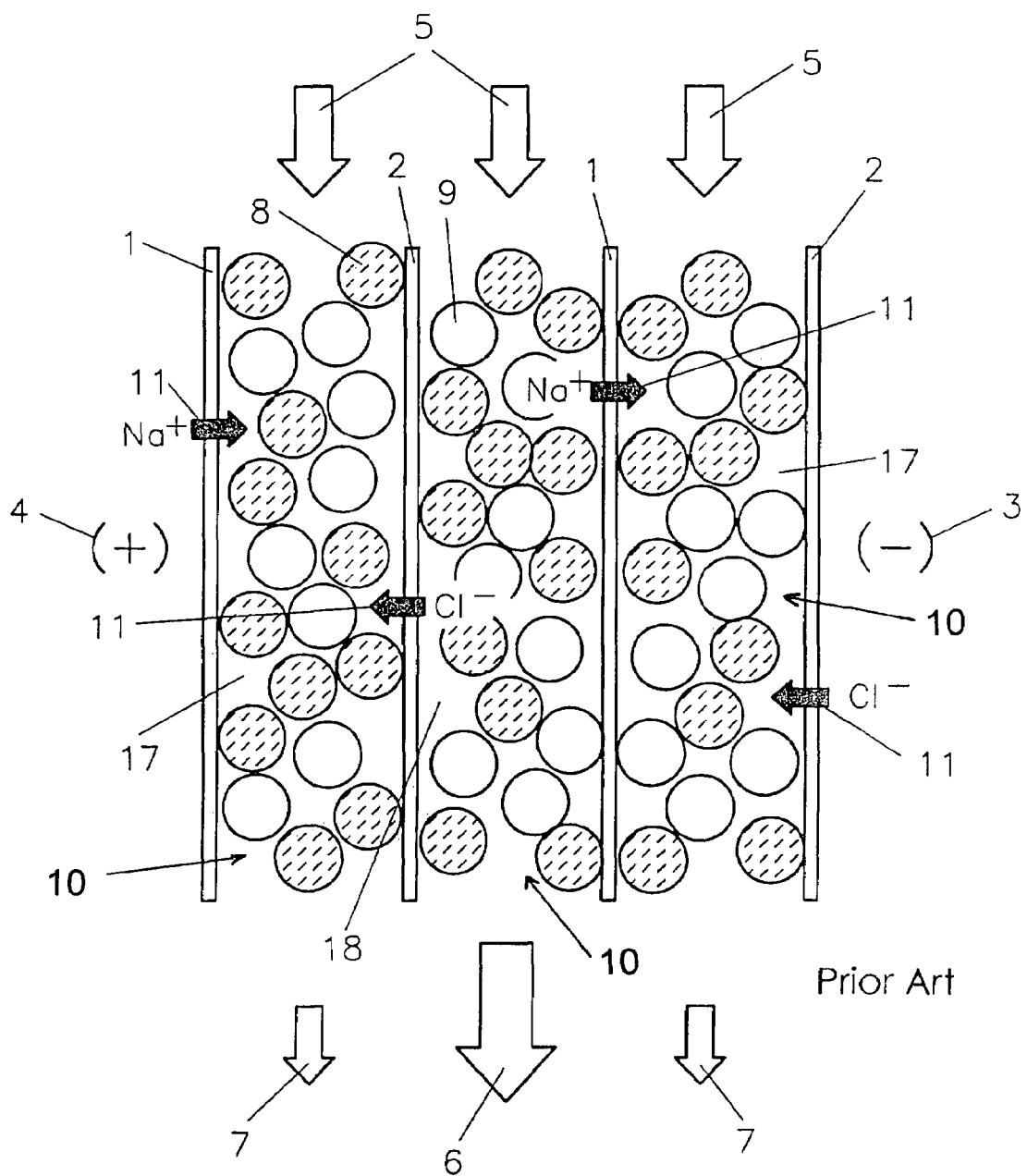
FIG. 1a shows schematically on EDI device wherein all compartments are filled with a mixed bed according to the state of the art [1]

As described in the introductory part and shown schematically in FIG. 1, an EDI device may consist of several cation exchanger membranes 1, several anion exchanger membranes 2, a cathode 3 and an anode 4, a supply 5 for the aqueous solution to be demineralized, separate discharge structures for the demineralized aqueous solution 6 and for the ion-enriched part of the aqueous solution 7 and mixed bed ion exchangers filled into the spaces between the cation and anion exchanger membranes 1 and 2 and consisting of statistically uniformly distributed anion exchanger particles 8 and cation exchanger particles 9. The cation and anion exchanger membranes 1 and 2 are stacked equally spaced and in an alternating fashion. The spaces between the exchanger membranes 1, 2 are called compartments 10. An aqueous solution is supplied to the compartments 10 by supply means 5 and is discharged by discharge means which are separate for each compartment and are arranged at opposite end faces of the stack so that the whole volume of each compartment 10 is exposed to the aqueous solution flow through the compartments 10. The stack is furthermore disposed in a housing which is not shown in FIG. 1a but which sealingly surrounds the EDI-device at all sides and which also includes the passages for the solution supply and discharge means 5–7. The housing also sealingly engages the individual exchanger membranes around all the outer edges thereof so that an overflow of the aqueous solution from one to another compartment 10 past the exchanger membranes 1 and 2 is prevented.

Furthermore, FIG. 1a shows the possible paths for the negatively charged anions, in the example $Cl^-$, through the anion exchanger membranes and for the positively charged cations, in the example $Na^+$, through the cation-exchanger membranes by arrows 11, particularly with a DC voltage differential effective on the cathode 4 and the anode 5.

Following these arrow directions, the cations and the anions are enriched in every second compartment, that is, the concentrate compartments 17, whereas the aqueous solution in the remaining half of the compartments, the demineralization compartments 18 is demineralized. In accordance therewith, the discharge means for the demineralized aqueous solution 6 are in communication with the demineralization compartments 18 and the discharge means for the ion-enriched part of the aqueous solution 7 are in communication with the concentrate compartments 17. The different discharge means 6 and 7 may of course be combined in a collective discharge means for the demineralized solution and, respectively, a collective discharge means for the ion-enriched aqueous solution.

Figure 1B:
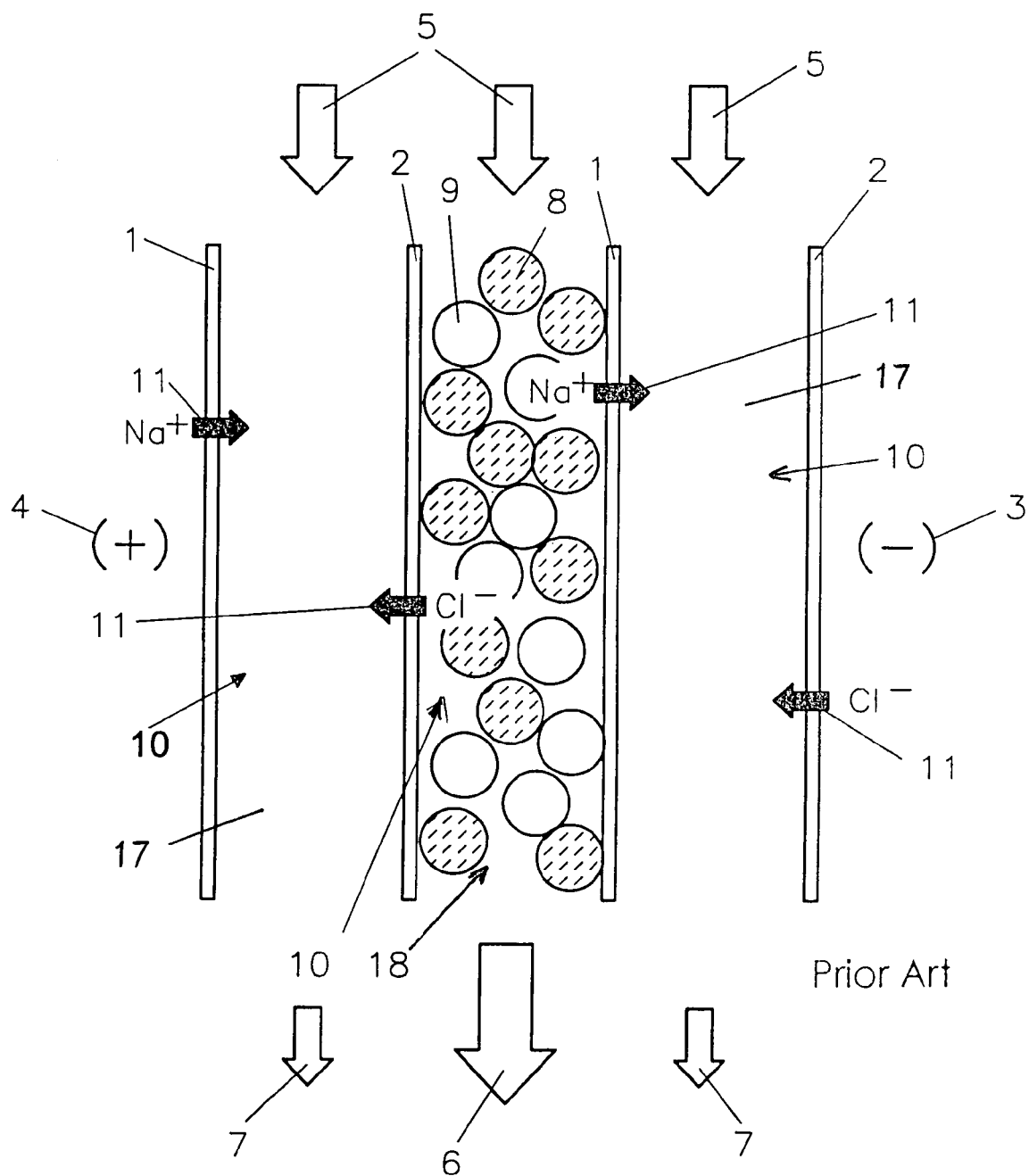
FIG. 1b shows schematically an EDI device wherein only the demineralization compartments are filled with a mixed bed ion exchanger in accordance with the state of the art [1]

The EDI device which is shown schematically in FIG. 1*b* is different from that shown in FIG. 1*a* in that the mixed bed is disposed only in the demineralization compartment 18.

Figure 2:
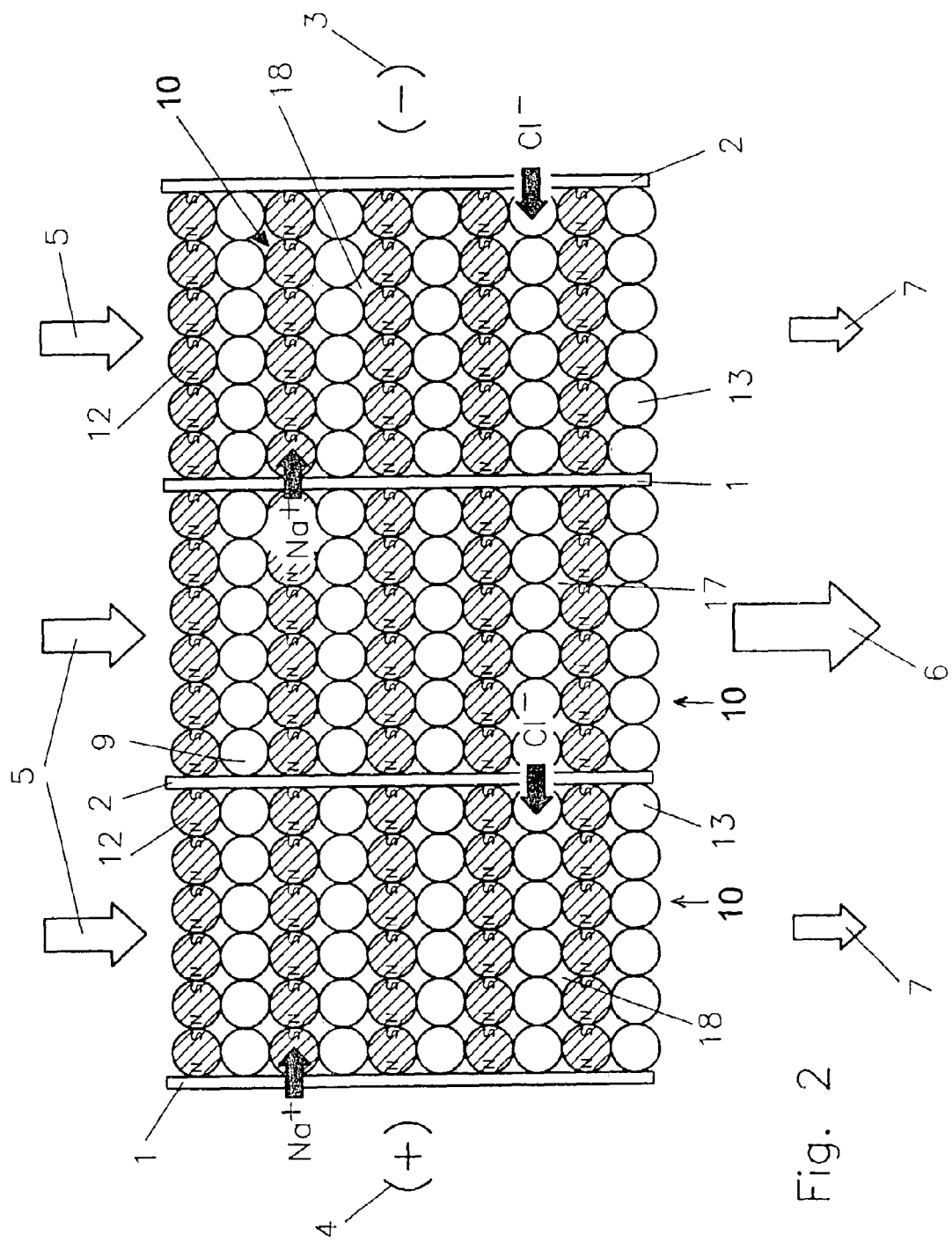
FIG. 2 shows schematically an EDI device without outer magnetic field but with one magnetically hard and one non-magnetic ion exchanger resin particle fraction in the compartments.

FIG. 2, in contrast, shows an EDT device with a self-aligning magnetically hard and a non-magnetic ion exchanger resin particle fraction 12 and, respectively 13 in the compartments 17, 18. It is not important whether the cation or anion exchanger resin particle fractions have the magnetic properties by admixture of additives. It is only important that all the particles of one of the fractions are magnetic whereas the particles of the other fraction are non-magnetic. The distribution of the particle fractions is shown in FIG. 2 in an idealized manner. For the proper orientation or alignment of the permanent-magnetic ion exchanger resin particles, the stack with all the components must be exposed to a magnetic field so that the magnetic particles align themselves in chains which extend parallel to the magnetic field lines. Consequently, the magnetic field lines should extend preferably normal to the membranes 1 and 2. Upon alignment and the formation of chains by the hard-magnetic particles in the mixed bed, the magnetic field is no longer needed because of the permanent magnetic properties of the hard-magnetic particle fraction.

Figure 3:
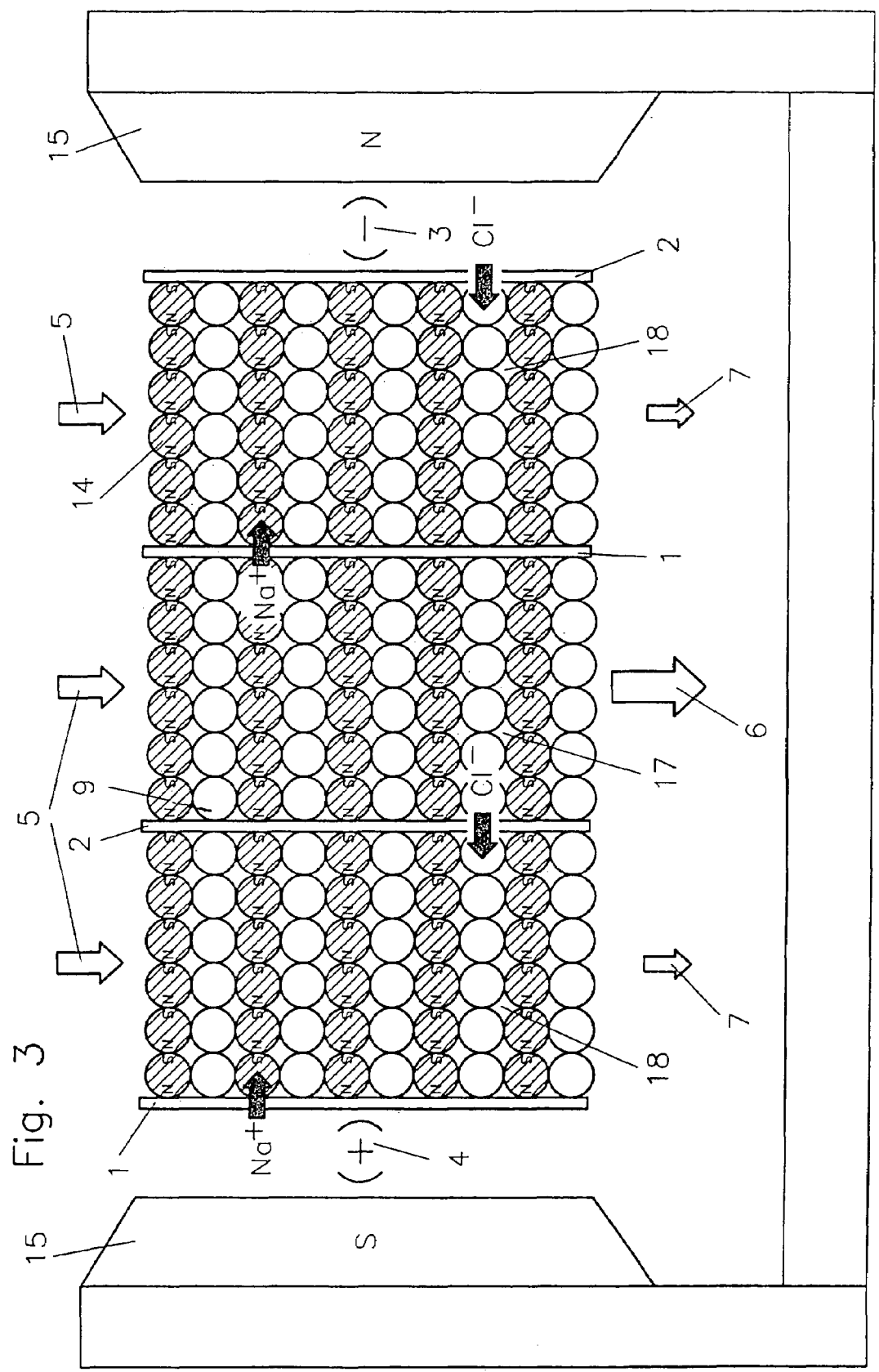
FIG. 3 shows schematically a MEDI device with a magnetic and a non-magnetic ion exchanger resin particle fraction in the compartments which are exposed to a magnetic field generated by a permanent magnet.

FIGS. 3 and 4 show a MEDI device consisting of an EDT device vice, which includes an integral structure for generating a magnetic field whose magnetic field lines extend through the whole stack of the EDT device preferably in a direction normal to the membranes 1 and 2. The arrangement may comprise at least a permanent magnet 15 (see FIG. 3) at least one electromagnet 16 (see FIG. 4) or at least one superconductive magnet for the generation of the magnetic field. In that case, a mixed bed is used which, in accordance with the design arrangement as described above in connection with FIG. 2, comprises cation and anion-exchanger resin particle fractions of which all the particles of one of the fractions have magnetic properties. In contrast to the arrangement as shown in FIG. 2 however this magnetic particle fraction 14 does not need to have permanent, that is, hard-magnetic properties. If a magnetic field is applied to the stack, also particles with soft-magnetic properties, that is particles which become magnetic when subjected to a magnetic field, are suitable. With these particles, the magnetic alignment occurs only upon establishment of the magnetic field.

Literature:

[1] J. H. Wood, G. C. Gani, P. A. Springthorpe: Continuous Electrodeionization-Module Design Considerations for the production of High Purity Water; in J. A> Greig: Ion Exchange at the Millenium, Proceedings of IEX 2000, Churchill College Cambridge 16–21 Jul. 2000, Imperial Collage Press 2000, pages 44–51. [2] U.S. Pat. No. 5,154,809 [3] U.S. Pat. No. 4,636,296

What is claimed is:

1. A device for the electrodeionization (EDI) in the de-mineralization of aqueous solutions, comprising:
   a) several cation and anion-exchanger membranes (1; 2) arranged alternately and in spaced relationship and being assembled to form a stack, with the spaces between the membranes forming compartments through which the aqueous solution can be conducted,
   b) a cathode (3) and an anode (4) disposed at opposite end membranes (1, 2) of said stack for establishing an electrical DC voltage across said stack,
   c) a mixed bed of cation and anion exchanger resin particle fractions (9, 8) disposed in at least some of said compartments, that is the demineralization compartments (18), in which, upon application of said DC voltage to the cathode (3) and anode (4), ions are enriched by permeation from the adjacent compartments, the concentration compartments (17), through the respective exchanger membranes into the demineralization compartments (18),
   d) liquid supply means (5) and discharge means (6, 7) at opposite ends of said stack for supplying the aqueous solution to, and removing the solutions separately from, said compartments,
   e) said ion exchanger resin particles of one of said fractions including a magnetic material so as to provide them with magnetic properties, and
   f) means (15,16) for generating a magnetic field with field lines which extend essentially normal to said ion exchanger membranes for orienting the magnetic resin particles and arranging them in mutually repelling chains between said ion exchanger membranes orienting themselves at the largest possible spacing from one another in the compartments and the compartment spaces between the chains being filled with ion exchanger particles of the other fraction.

2. A device according to claim 1, wherein all compartments (10) of said stack contain mixed bed resins.

3. A device according to claim 1, wherein said device includes at least one magnet (15) for generating said magnetic field.

4. A device according to claim 3, wherein said magnet is an electromagnet.

5. A device according to claim 3, wherein said magnet (15) is a superconductive electromagnet.

6. A device according to claim 3, wherein said magnet (15) is a permanent magnet.

7. A device according to claim 1, wherein said ion exchange resin particles of one of said fractions include additives with mainly hard-magnetic properties and said magnetic field is switchable so that, upon alignment and proper orientation of the magnetic ion exchanger resin particles filling said compartments (10), the magnetic field can be switched off.

8. A device according to claim 1, wherein said ion exchange resin particles of one of the two fractions include additives with mainly soft-magnetic properties such that the ion exchange resin particles of said one fraction become magnetic only when exposed to a magnetic field.

* * * * *